United States Patent [19]
Takiguchi et al.

[11] Patent Number: 5,856,908
[45] Date of Patent: Jan. 5, 1999

[54] WIRE HARNESS AND INSTRUMENT PANEL ASSEMBLY

[75] Inventors: Shuji Takiguchi; Keizo Nishitani; Satoru Unno, all of Shizuoka, Japan

[73] Assignee: Yazaki Corporation, Tokyo

[21] Appl. No.: 856,536

[22] Filed: May 14, 1997

[30] Foreign Application Priority Data

May 16, 1996 [JP] Japan .................................. 8-121999

[51] Int. Cl.$^6$ .............................. H05H 7/20; H01R 33/00
[52] U.S. Cl. ...................... 361/690; 174/72 A; 307/10.1; 361/627; 361/826; 439/34
[58] Field of Search ........................ 174/72 A; 307/10.1, 307/147, 148; 361/690, 627, 637, 640, 826–827; 296/192; 180/90; 439/34, 36, 247, 248

[56] References Cited

U.S. PATENT DOCUMENTS

| | | | |
|---|---|---|---|
| 5,324,203 | 6/1994 | Sano et al. | 439/34 |
| 5,502,615 | 3/1996 | Kubota et al. | 307/10.1 |
| 5,615,080 | 3/1997 | Nishitani et al. | 307/10.1 |
| 5,651,683 | 7/1997 | Shimamura et al. | 439/34 |

FOREIGN PATENT DOCUMENTS 5-77659   3/1993   Japan .

*Primary Examiner*—Gregory D. Thompson
*Attorney, Agent, or Firm*—Armstrong, Westerman, Hattori, McLeland and Naughton

[57] ABSTRACT

A plurality of electrical equipment units have a harness connecting connector, and an instrument panel has a plurality of mounting openings for the equipment units. An assembly housing is arranged in the instrument panel. A wiring harness for the instrument panel has a plurality of self-mating connectors for the equipment units, the self-mating connectors being respectively connected to a flexible flat circuit sheet. The assembly housing has a side wall with a harness receiving recess and has a plurality of connector holders. The harness receiving recess is fixedly mounted with the circuit sheet for the wiring harness, each of the connector holders supporting one of the self-mating connectors. Thus, the insertion of the electrical equipment unit into the mounting opening of the instrument panel causes the connection of the harness connecting connector and the self-mating connector.

12 Claims, 8 Drawing Sheets

WIRE HARNESS AND INSTRUMENT PANEL ASSEMBLY

BACKGROUND OF THE INVENTION

1. Field of the Invention

This invention relates to a wiring harness and instrument panel assembly provided in a motorcar, allowing an improved assembling and coupling process of various electrical equipment units and wiring harnesses in the instrument panel.

2. Description of the Prior Art

FIG. 11 shows a known instrument panel provided in a motorcar as disclosed in Japanese Patent Application Laid-open No. 5-77659. This consists of separately formed upper and lower resin panels 51, 52. In the engagement faces of the panels 51, 52 there are formed cavities such as air ducts 53, 54 or a wiring harness space 55. The space 55 receives a wiring harness 56 or is provided with an electric circuit made by coating an electrically conductive paint. The engagement of the panels 51, 52 accomplishes the simultaneous connection of the wiring harness. Further, the arrangement gives advantages in fabrication process such as forming, transportation, storage, and assembling.

The above-mentioned instrument panel consisting of the two panels requires none of a wiring harness fixing clamp, an enclosing protector and the like. This allows a great reduction in part number and in production man-hour for the instrument panel. However, the correct connection of the wiring harness to switches, meters, and electrical equipment units depends on the right engagement of the abutment faces of the panels 51, 52. Non-correct engagement of the faces may cause a gap, resulting in an unstable connection of the harness.

For achieving the right connection, application of a lead wire extending from the wiring harness 56 of the lower panel 52 may be proposed. But, in engagement of the upper and lower panels, this may causes jamming of the lead wire, and a noise may be generated by the lead wire with a slack during the vehicle's running.

Further, vehicle body vibration generated during running or by in collision may bring about electrically wrong continuity due to the sliding movement of electrical wires in the space 55. Moreover, air temperature around the instrument panel causes the instrument panel to thermally expand. This may break fine wire circuits (smaller than 0.3 square millimeter) used for a wiring harness in the instrument panel, or may require a careful maintenance thereof.

SUMMARY OF THE INVENTION

In view of the aforementioned drawback, an object of the present invention is to provide a wiring harness and instrument panel assembly that does not require any accessory such as a harness securing clamp or a protector. Further, the wiring harness assembly is easily mounted in the instrument panel and allows a more simplified connection to electrical equipment units with keeping a reliable electrical continuity.

For achieving the object, according to a first aspect of the invention, a wiring harness and instrument panel assembly includes:

a plurality of electrical equipment units having a harness connecting connector;

an instrument panel having a plurality of mounting openings for the equipment units;

an assembly housing arranged in the instrument panel; and a wiring harness having a flexible flat circuit sheet and a plurality of self-mating connectors for the equipment units, the self-mating connectors being respectively connected to the flexible flat circuit sheet, wherein the assembly housing has a side wall with a harness receiving recess and has a plurality of connector holders, the harness receiving recess being fixedly mounted with the circuit sheet for the wiring harness, each of the connector holders supporting one of the self-mating connectors, the insertion of the electrical equipment unit into the mounting opening of the instrument panel causing the connection of the harness connecting connector and the self-mating connector.

According to an additional feature of the invention, the assembly housing has an air duct main body and a sub-duct provided in the middle of the front face if the main body; the air duct main body has a welding face at an upper periphery thereof; and the welding face is welded to and sealed by the top wall of the instrument panel.

In a second aspect of the invention, the connector holder is mounted in the instrument panel side in place of in the assembly housing.

Operational effects of the invention will be discussed hereinafter.

In the first aspect of the invention, the harness is preliminarily disposed to be secured in the harness receiving recess of the assembly housing. And, the self-mating connector is attached to the connector holder for the electrical unit. Thereby, when the mounting opening of the instrument panel has received the electrical equipment unit, the self-mating connector engages with the harness connecting connector. This accomplishes the attachment of the equipment unit and also the electrical connection between the unit and the harness for the instrument panel. Moreover, this provides reliable, simplified fitting steps of the harness and the electrical equipment unit to the instrument panel.

Furthermore, the harness receiving recess provided in the assembly housing eliminates the harness arrangement around the engagement face opposite to the instrument panel as discussed in the prior art. This prevents the jamming of the circuit sheet and the circuit cut-off due to thermal repeated deformation of the instrument panel. The self-mating connector for the units preferably is resiliently supported by the connector holder to allow a vertical and lateral movement of the connector, which easily absorbing its deviation in the alignment with the electrical equipment unit or with the harness connecting connector. Consequently, this accomplishes a more reliable electrical connection between the instrument panel harness and the equipment units.

The additional feature of the invention includes the assembly housing composing an air duct inevitably provided in a motor car. This requires no arrangement of a specified air duct of another body in the instrument panel, enabling a simplified inner structure of the instrument panel.

The second aspect of the invention provides almost the same effects as the first aspect. The arrangement of the connector holder in the instrument panel side allows more stable jointing of the self-mating connector to the harness connecting connector of the electrical equipment unit.

DETAILED DESCRIPTION OF THE PREFERRED EMBODIMENTS

Referring to the accompanied drawings, preferred embodiments will be discussed hereinafter.

Figure 1:
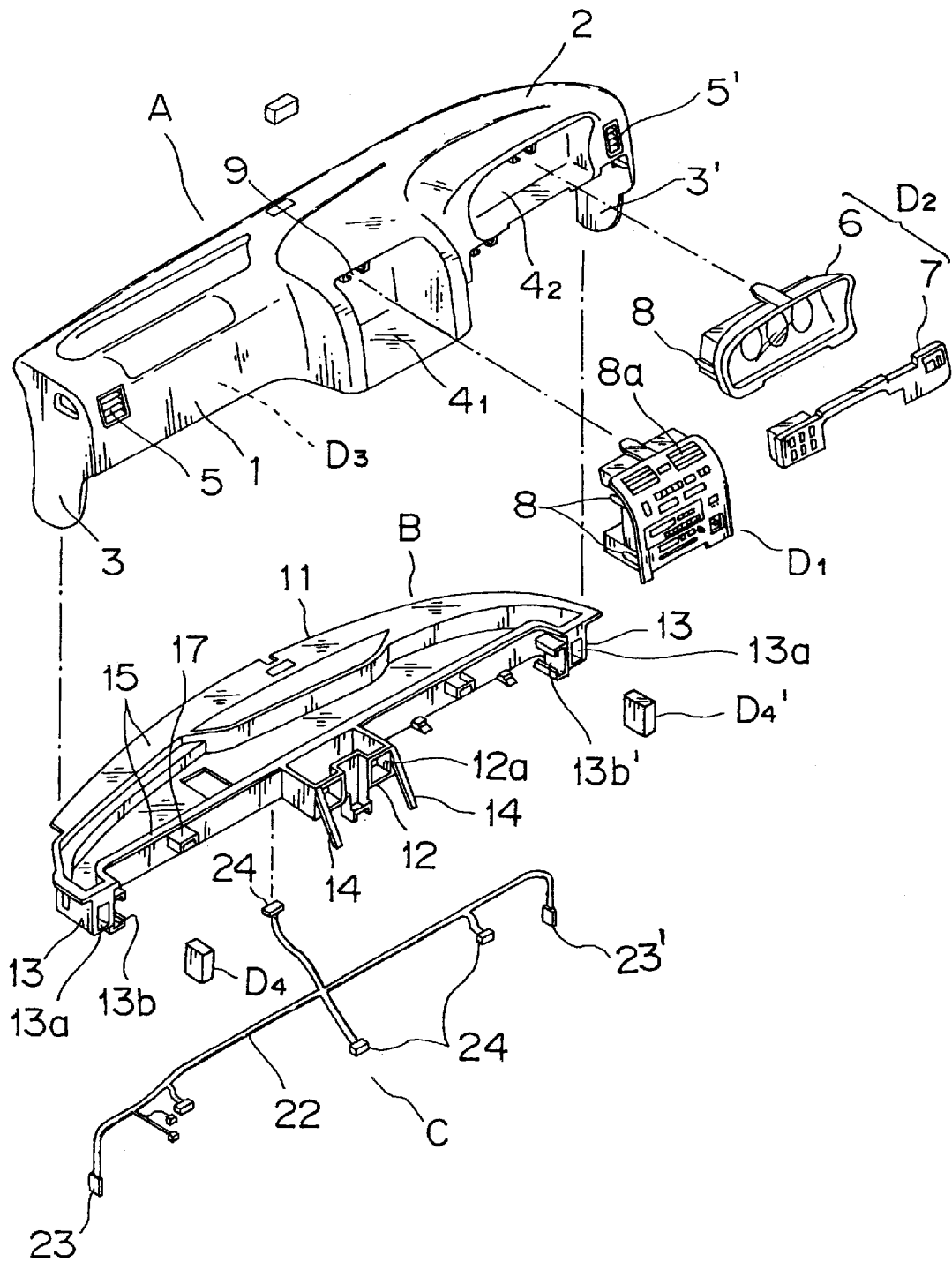
FIG. 1 is an exploded perspective view showing a wiring harness assembly for an instrument panel of an embodiment according to the present invention.

In FIG. 1, designated A is an instrument panel made of an insulating synthetic resin; B an assembly housing; C a wiring harness; and $D_1$, $D_2$, $D_3$ for the instrument panel denote electrical equipment units, respectively a center cluster unit, a meter unit, and an air bag unit.

The instrument panel A is a structure consisting of a front wall 1, a top wall 2, and each side wall 3, 3'. In the middle of and in the right side of the front wall 1 are respectively provided mounting openings $4_1$, $4_2$ for the electrical equipment units. Further, in the left side of the wall 1 there is mounted the air bag unit $D_3$. Furthermore, at each side end of the wall 1 are respectively provided air outlets 5, 5' with flow adjusting fins for air conditioning.

The center cluster unit $D_1$ and the meter unit $D_2$ consisting of a meter main body 6 and its bezel 7 have respectively a projecting, unit securing clamp 8; the relative mounting openings $4_1$, $4_2$ have clamp guides 9 therein.

The wiring harness C for the instrument panel, which will be discussed later in detail, has a flexible flat circuit sheet 22, at each end of which usual connectors 23, 23' are attached. In the middle of the sheet 22 there are provided a plurality of self-mating-type connectors 24 for the electrical equipment units. The end connectors 23, 23' connect to harnesses (not shown) for a cowl side and for the engine room. The self-mating-type connectors 24 connects to harness connecting connectors 34 (FIG. 7) for the electrical equipment units.

Figure 2:
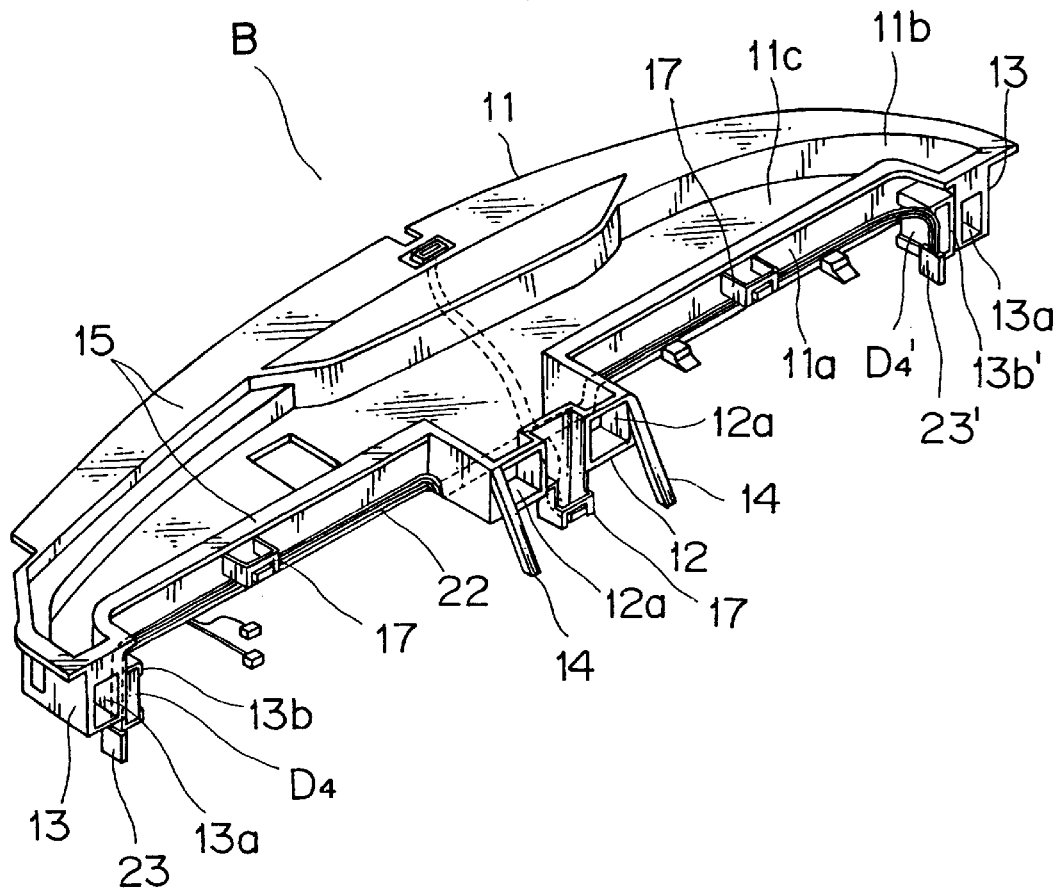
FIG. 2 is an enlarged perspective view showing an assembly housing in FIG. 1.

As shown in FIG. 2, the assembly housing B constitutes an air duct. This air duct B includes a duct 11 and a sub-duct 12 extending from the middle of the duct 11. The duct 11 has a flat front wall 11a, an arc-shaped rear wall 11b, and a bottom plate 11c, configuring a box; the front wall 11a is separately provided at each side of the sub-duct 12; from each side of the rear wall 11b there is extending a cylindrical hood 13 that curves to face the front; the hood 13 connects downward to an air conditioning apparatus (not shown); and at the front face of the hood 13 is formed an opening 13a communicating with the air blowing outlet 5 or 5'. The central sub-duct 12 communicates with the duct 11 and has an opening 12a at each side portion thereof so as to communicate with an air blowing port 8a of the center cluster unit $D_1$. Further, at each end of the front face is extending a downwardly inclined bracket 14, and the bracket is bolted to an inner wall of the central mounting opening $4_1$ of the instrument panel A.

Besides, inside each hood 13 of the air duct body 11 are formed boxes 13b, 13b' receiving concentrated control units such as a major junction node or an ECU (electronic control unit) $D_4$, $D_4'$. The concentrated control units $D_4$, $D_4'$ can control almost all of vehicle electrical equipment units such as the center cluster unit $D_1$, the meter unit $D_2$, and the air bag unit $D_3$.

Further, the duct 11 has peripheral walls (front wall 11a, rear wall 11b, and hood 13), and on an upper periphery of the duct 11 there is formed a welding face 15. The front wall 11a has a harness receiving recess 16 in the almost overall lateral length thereof. And, a plurality of connector holders 17 are unitedly provided in the mounting openings $4_1$, $4_2$ of the front wall 11a.

Figure 3A:
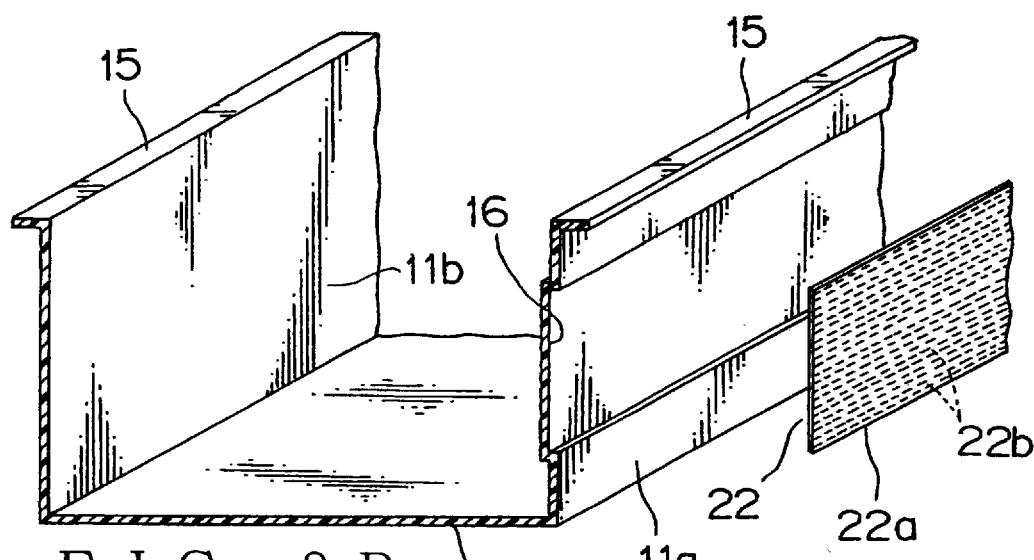
FIGS. 3A and 3B are explanatory perspective views respectively showing a harness arranging method for the instrument panel, in which the harness is disposed in a harness receiving recess of the assembly housing in FIG. 2.
Figure 3B:
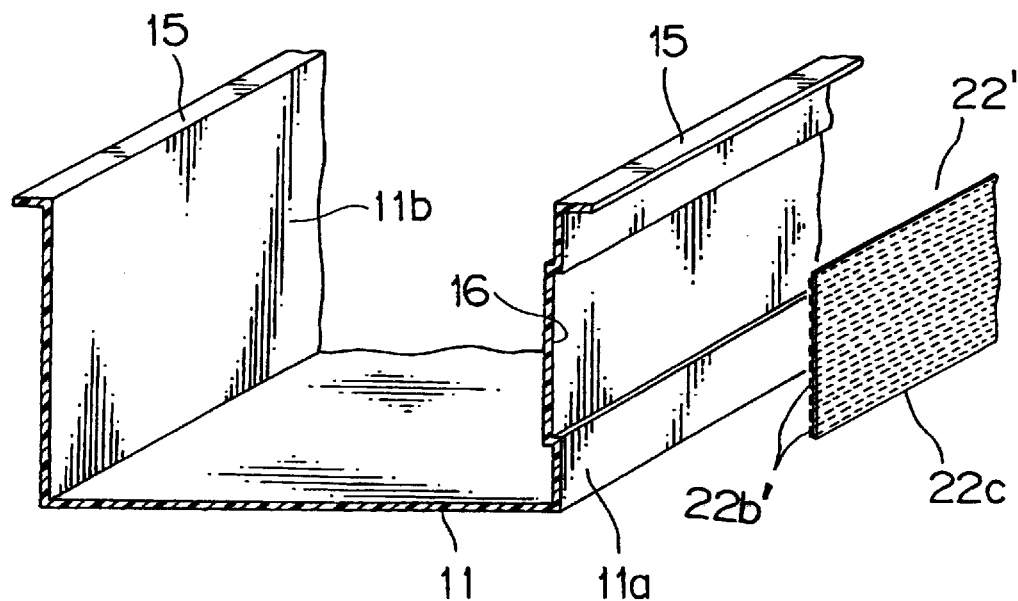

As shown in FIGS. 3A and 3B, the harness receiving recess 16 on the duct 11 receives a circuit sheet 22 or 22' of the harness for the instrument panel.

The circuit sheet 22 in FIG. 3A is a flexible print circuit (FPC) having a plurality of circuit conductors 22b disposed in parallel on an insulating sheet 22a and made of copper foil. The sheet has one side adhesive surface for sticking to a bottom surface of the harness receiving recess 16.

The circuit sheet 22' in FIG. 3B consists of a flexible flat circuit (so-called FFC), and has a plurality of circuit conductors 22b' consisting of strips, fine element wires, or enamel coated copper wires and disposed in parallel on an insulating sheet 22c. The circuit sheet 22' is put on the harness receiving recess 16 that has been coated by an adhesive.

Figure 4:
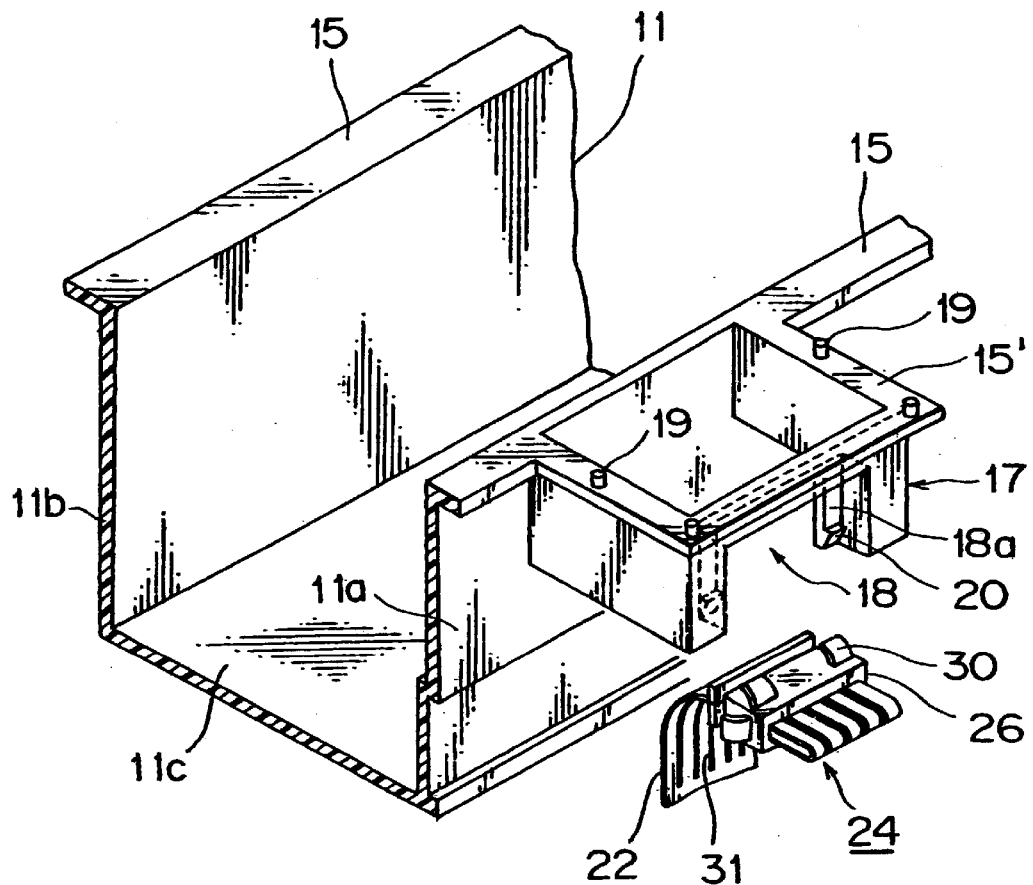
FIG. 4 is a partial enlarged perspective view showing a connector holder in the assembly housing shown in FIG. 1.
Figure 5:
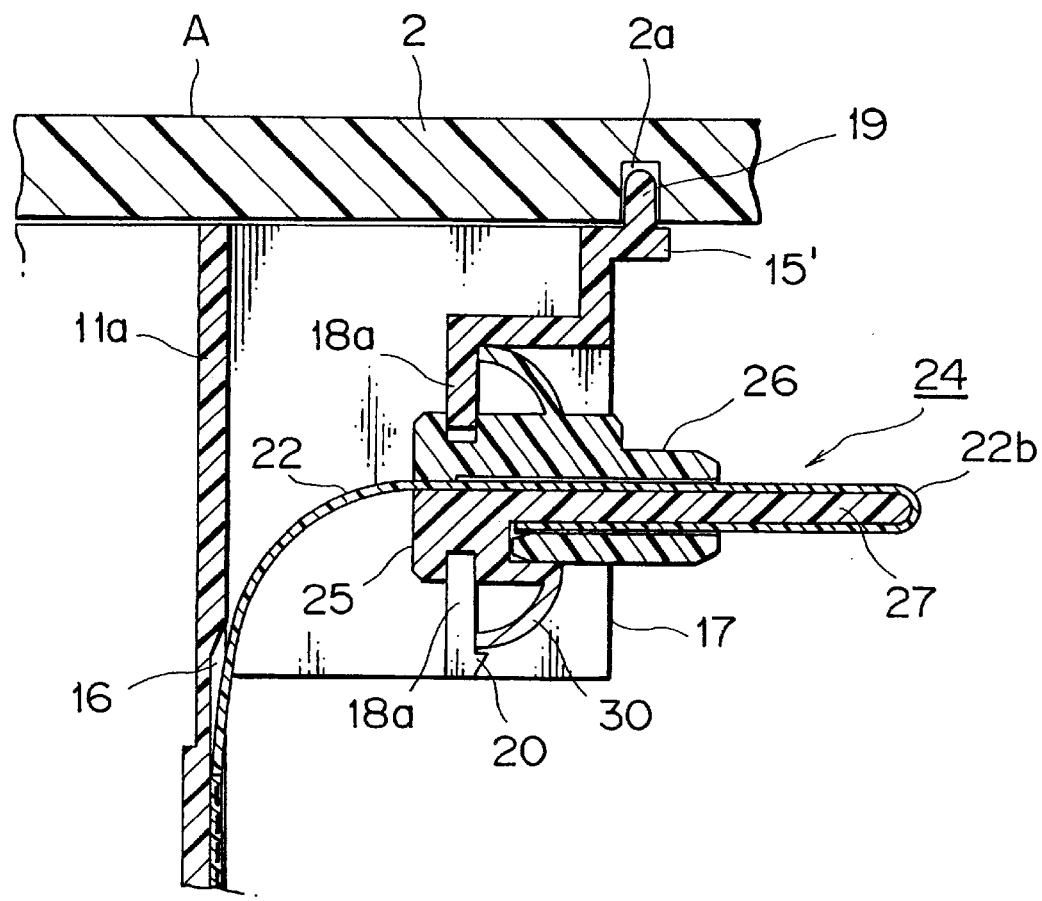
FIG. 5 is a sectional view showing the state that the connector holder in FIG. 4 has supported a self-mating connector for an electrical equipment unit.

Referring to FIGS. 4 and 5, the self-mating connector 24 can be jointed to the connector holder 17 by one fitting action.

That is, the connector holder 17 is unitedly formed in the front wall 11a and composes a box frame extending from the duct 11. The holder 17 has a connector receiving opening 18 provided in its front face. An inside side surface of the opening 18 has a step to compose an inner larger space. At the upper end periphery of the duct 11 there is formed a frame 15' extending from the welding face 15 in the same plain, the frame 15' having a plurality of bosses 19 thereon. The bosses 19 are inserted into rear holes 2a formed in the top wall 2 of the instrument panel A to be secured by heat welding. Further, the connector receiving opening 18 has each side bar 18a with a lock protrusion 20 so as to lock the self-mating connector 24 for the units, which will be discussed later in more detail.

Figure 6:
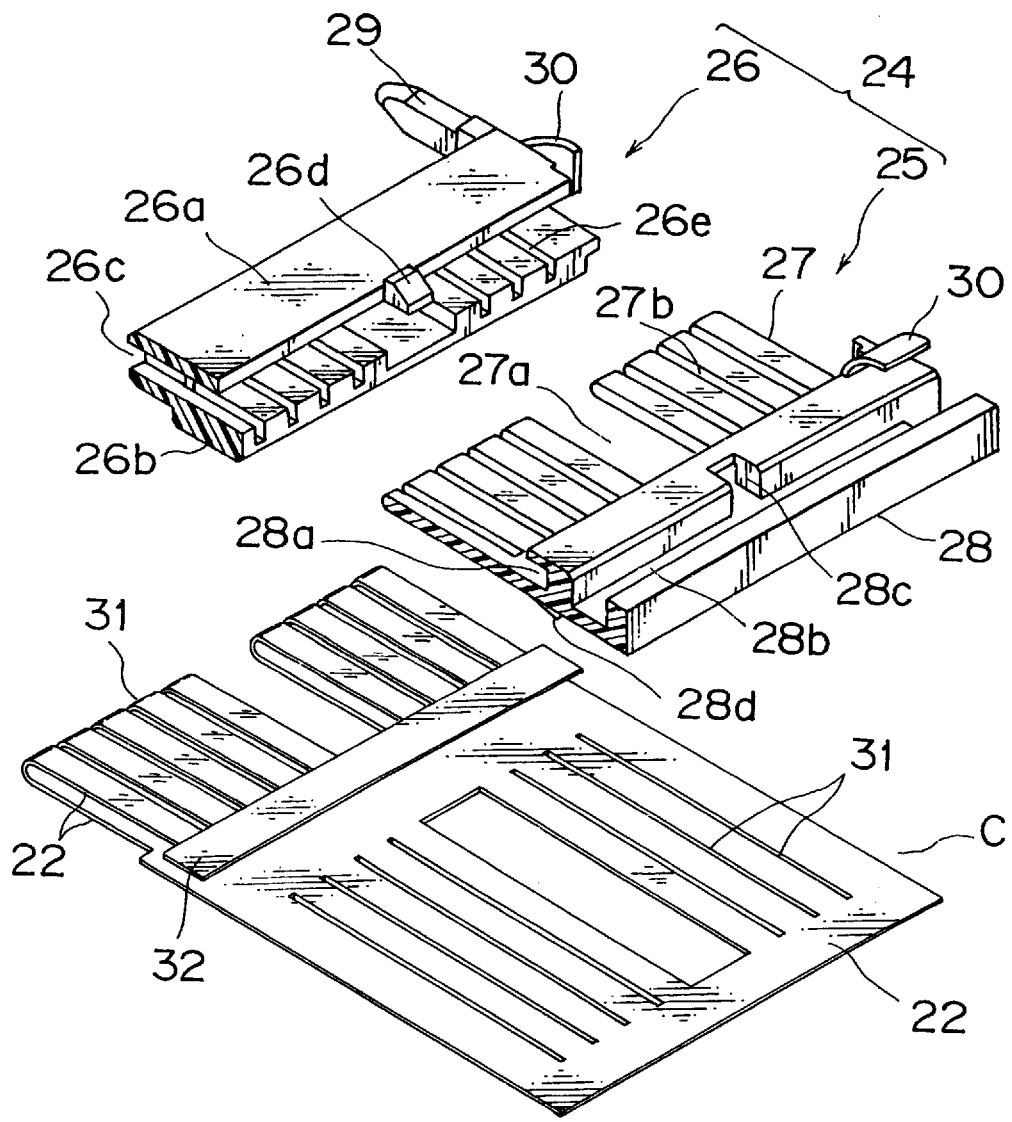
FIG. 6 is an exploded perspective view of the self-mating connector in FIG. 5.

As shown in FIG. 6, the self-mating connector 24 for the units consists of a terminal retainer 25 and an insulating housing body 26.

The retainer 25 has a support plate 27 for supporting the flexible flat circuit sheet 22 and a beam 28 holding the plate 27. The circuit support plate 27 is separately formed at each side of a central gap 27a in an example shown in the drawing. On the upper surface of the circuit support plate 27 are formed a plurality of parallel slit channels 27b. The slit channels 27b align with insulating ribs (not shown) for partitioning terminal receiving chambers 35a of the harness connecting connector 34, which will be further discussed later. Meanwhile, the beam 28 has a housing receiving channel 28a at the front, and has a holder receiving channel 28b formed in the upper face thereof. In the middle of the holder receiving channel 28b there is provided a lock channel 28c, and on the under surface of the beam 28 are provided a plurality of parallel ribs 28d for aligning the beam with the insulating housing main body 26.

The insulating housing body 26 has upper and lower walls 26a and 26b with a slit therebetween. A front opening 26c of the housing 26 allows the circuit support plate 27 of the retainer 25 to pass through. The insulating housing body 26 has a forwardly extending, guide projection 29 at each side end thereof. The upper wall 26a is shorter than the lower wall 26b in the longitudinal direction. A peripheral end of the upper wall 26a engages with the housing receiving channel 28a of the retainer 25.

In the middle of the peripheral end of the upper wall 26a of the insulating housing body 26 there is formed a lock projection 26d engaging with the lock channel 28c of the retainer 25. In an inside surface of the lower wall 26b is formed the parallel guide grooves 26e for guiding the aligning ribs 28d.

Further, a spring plate 30 is fitted at each upper side end of the beam 28 of the retainer 25, and another spring plate 30 is fitted at each side portion of the insulating housing body 26 and at each side portion of the lower wall 26b. The spring plates 30 allow the inserted self-mating connector 24 for the units to deviate a little vertically and laterally in the connector receiving opening 18 of the connector holder 17.

In assembling of the self-mating connector 24, as shown in FIG. 6, the first step is to put a compensating adhesive tape 32 on the leading end of the circuit sheet 22. Then, the circuit sheet 22 is turned back in a U-shape along the upper and lower faces the circuit support plate 27 of the retainer 25. Besides, the circuit sheet 22 has slits 31 between the circuit conductors 22b (FIG. 3B) across the retainer 25.

Next, the circuit support plate 27 is inserted between the upper and lower walls 26a, 26b of the insulating housing body 26 so as to pass through to extend from the forward opening 26c. Thereby, the upper wall 26a engages with the housing body receiving channel 28a formed in the fore portion of the beam 28 of the retainer 25. Further, the lock projection 26d engages with the lock channel 28c so that the retainer 25 locks in the insulating housing body 26. In the insertion of the retainer 25, the aligning rib 28d provided on the under surface thereof enters into the guide groove 26e in the lower wall 26b of the insulating housing body 26. Thus, the self-mating connector 24 for the units can be assembled in such simplified steps.

The self-mating connector 24, as shown in FIG. 4, is inserted upwardly into the connector receiving opening 18 of the connector holder 17. In this step, each side rim bar 18a guides the holder receiving channel 28b of the retainer 25. When the connector has reached its highest position, a lower spring plate 30, as shown in FIG. 5, engages with the lock protrusion 20 to lock thereto. And, the spring plates 30 around the connector 24 support the self-mating connector 24 in the connector receiving opening 18 movably in the vertical and lateral directions. Thus, the self-mating connector 24 can be easily attached to the connector holder 17.

Figure 7:
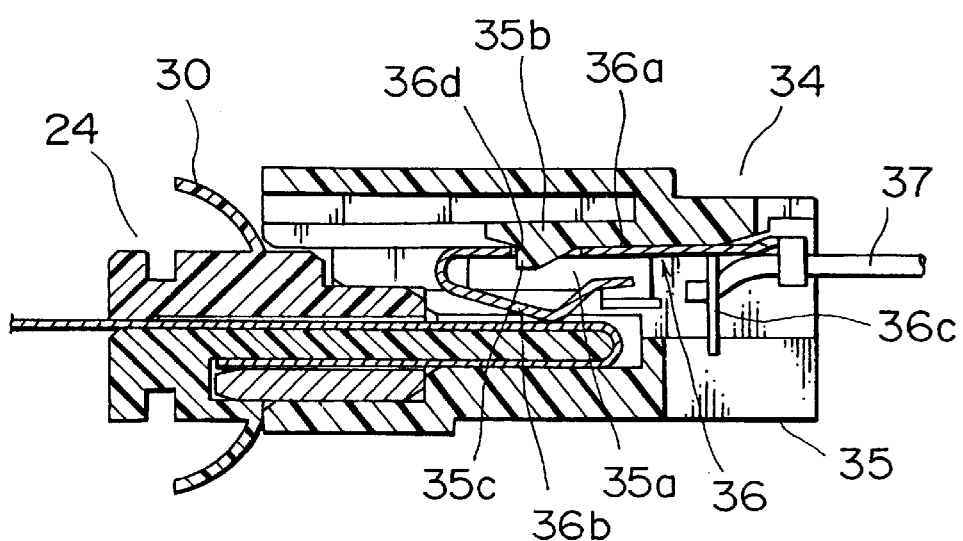
FIG. 7 is a sectional view showing the state that the self-mating connector in FIG. 6 has connected to a unit connecting connector provided in a harness for the instrument panel.

FIG. 7 is a sectional view showing the jointed state of the self-mating connector 24 and the harness connecting connector 34 for the electrical equipment unit $D_1$ or the like.

The harness connecting connector 34 includes a press-contacting terminal 36 in a terminal accommodating chamber 35a of its insulating housing 35. That is, the insulating housing 35 has a plurality of parallel terminal accommodating chambers 35a, each chamber having a resilient locking arm 35b with a lock protrusion 35c. The lock protrusion 35c engages with a lock hole 36d provided in a base plate 36a of the press-contacting terminal 36 so as to lock the press-contacting terminal 36. The press-contacting terminal 36 has an elastic tongue portion 36b turning back the forward portion of the base plate 36a. The elastic tongue portion 36b can contact against the circuit conductor 22b of the self-mating connector 24. Further, a rearward press-contacting piece 36c having a slot (not shown) is disposed in the housing 35, allowing press-contacting of an electrical wire in the slot.

In the above-mentioned structure, the wiring harness C for the instrument panel may be preliminarily arranged in a harness receiving recess 16 of the assembly housing as illustrated in FIGS. 3A and 3B. Further, the self-mating connector 24 may be preliminarily attached to the connector holder 17 as shown in FIG. 5. Alternatively, the self-mating connector 24 may be attached prior to the arrangement of the wiring harness C for the instrument panel. In FIG. 5, between the harness receiving recess 16 and the self-mating connector 24 having been attached to the connector holder 17 there is a clearance of tens millimeter, This allows a flexible connection of the circuit sheet 22 of the wiring harness C mounted in the instrument panel.

In this state, the welding face 15 of the assembly housing B is welded to the top wall 2 of the instrument panel A by an ultrasonic welding apparatus (not shown). Thereby, the air duct main body 11 is covered to be secured to the instrument panel A. Each side hood opening 13a communicates with the air blowing outlet 5 or 5'. At the same time, the bosses 19 formed on the frame 15' of the sub-duct 12 in the front face of the duct 11, as shown in FIG. 5, are positioned in the holes 2a of the top wall 2. The bosses are selectively secured by welding.

Next, the electrical equipment units of the center cluster unit $D_1$ and the meter unit $D_2$ are inserted into each mounting opening $4_1$ or $4_2$ from the front side of the instrument panel A. Each electrical equipment is smoothly disposed by using the unit securing clamps 8 and their clamp guides 9.

Furthermore, by the forwardly extending, guide projection 29 (shown in FIG. 6) of the self-mating connector 24, the harness connecting connector 34 for each electrical equipment units is smoothly connected. As shown in FIG. 7, the circuit conductor 22b of each connector contacts against an elastic tongue portion 36b of the press-contacting terminal 36 of the opposing connector, allowing electrical continuity thereof. In the connection described above, the self-mating connector 24 has been supported so as to allow vertical and lateral deviations thereof in the connector receiving opening 18. Thereby, a little offset between the harness connecting connector 34 and the connector 24 can be easily absorbed. Further, the U-shaped fore portion of the circuit conductor 22b held by the circuit support plate 27 can smoothly advance into the harness connecting connector 34 without damaging the elastic tongue portion 36b.

Thus, the mounting of the electrical equipment units accomplishes simultaneously electrical connection of the harness C for the instrument pane. This allows a better assembling process with an improved attachment of the harness C and the electrical equipment units $D_1$, $D_2$ in the instrument panel A.

Figure 8A:
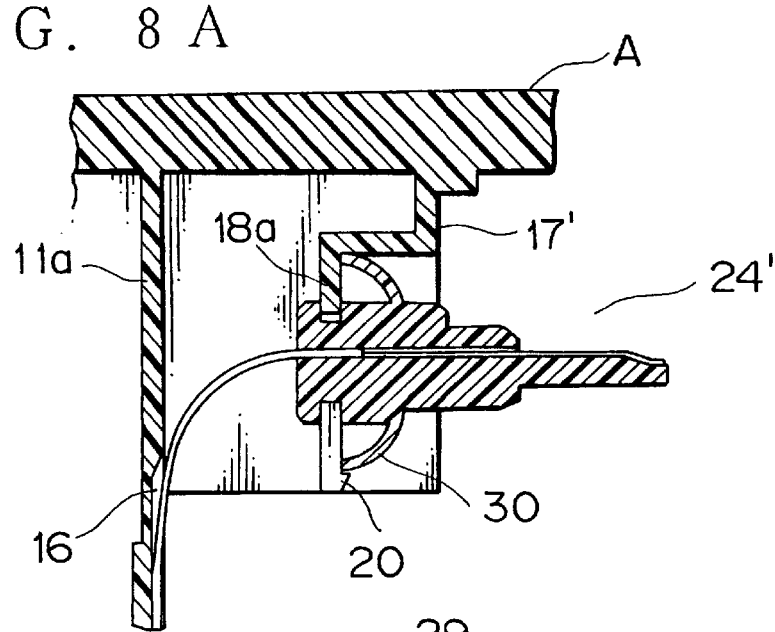
FIG. 8A is a sectional view showing the state that another connector holder according to the invention has supported a self-mating connector for another electrical equipment unit.
Figure 8B:
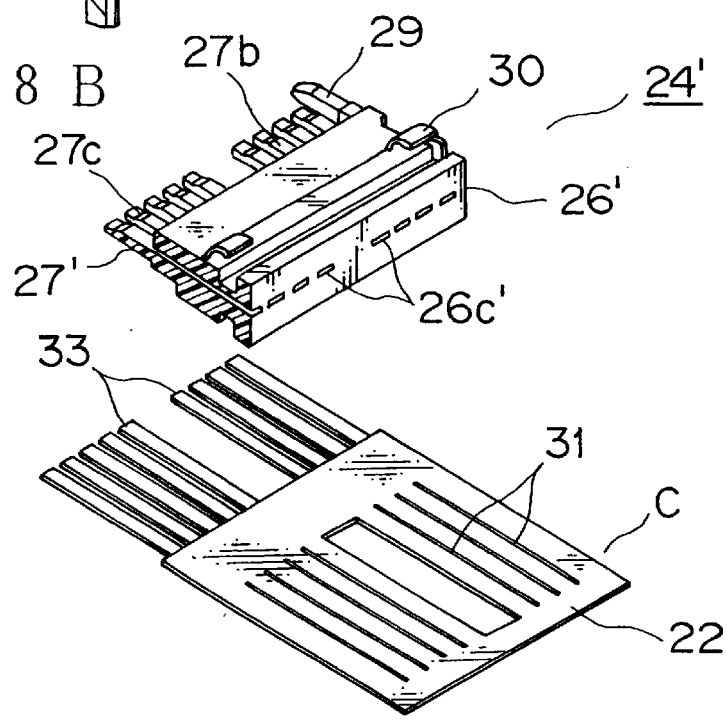
FIG. 8B is an exploded perspective view showing the self-mating connector shown in FIG. 8A.
Figure 8C:
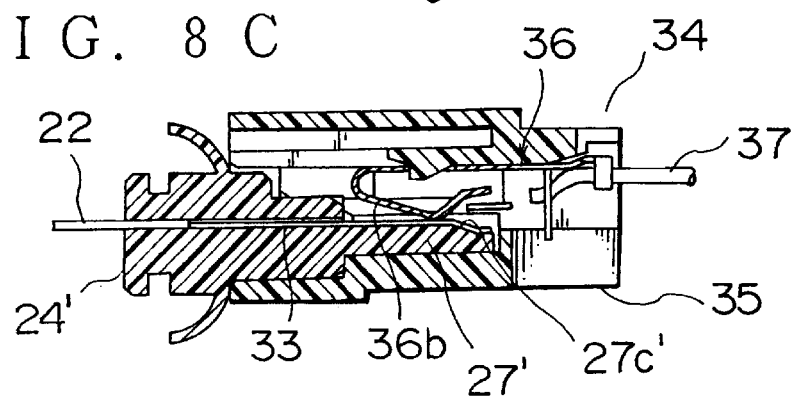
FIG. 8C is a sectional view showing the state that the self-mating connector has connected with the unit connecting connector.

FIGS. 8A to 8C show another embodiment modified in the connector holder and the self-mating connector for the units.

That is, differing from FIGS. 4 and 5, a connector holder 17' is formed unitedly with the top wall 2 of the instrument panel A. A self-mating the connector 24'0 attached to the connector holder 17' allows more stable jointing of the harness connecting connector 34 of the electrical equipment unit.

The self-mating connector 24' has an insulating housing 26' that serves as a unitedly formed body including the retainer 25 and the insulating housing body 26 of the self-mating connector 24. In the middle of the insulating housing 26' there are formed a plurality of slits 26c'. Further, the housing 26' has a plurality of forwardly extending, circuit support plates 27', at each fore end of which there is formed a downwardly stepped portion 27c.

Meanwhile, a circuit sheet 22 has a plurality of tabs 33 at the fore part thereof, each tab 33 having a very small stiffness and being connected to the circuit conductor 22b (shown in FIG. 3) by ultrasonic welding or the like. Each tab 33 is inserted into the slit 26c' and its leading end is bent so as to fit the stepped portion 27c of the circuit support plate 27'.

The other construction of the connector 24' is the same as the self-mating connector 24.

The self-mating connector 24', as shown in FIG. 8C, has the tab 33 with the lowered tip along the downwardly stepped portion 27c of the circuit support plate 27'. This arrangement enables its smooth connection with the harness connecting connector 34 in the same way as the construction shown in FIG. 7.

Figure 9A:
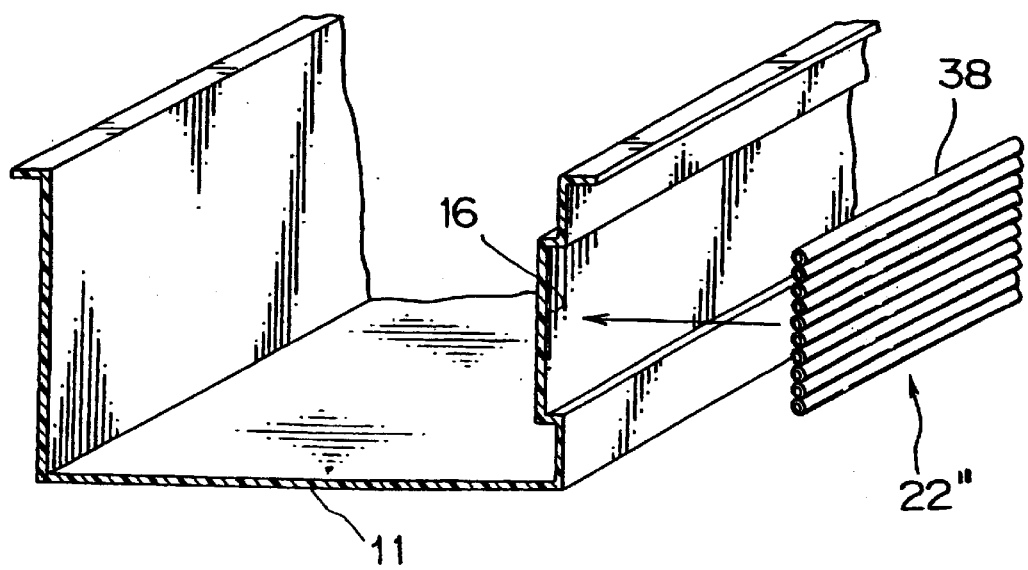
FIGS. 9A and 9B are explanatory perspective view respectively showing another harness arranging method for the instrument panel, in which the harness is arranged in a harness receiving recess of the assembly housing, FIG. 9A showing a step before the arrangement, FIG. 9B after the arrangement.
Figure 9B:
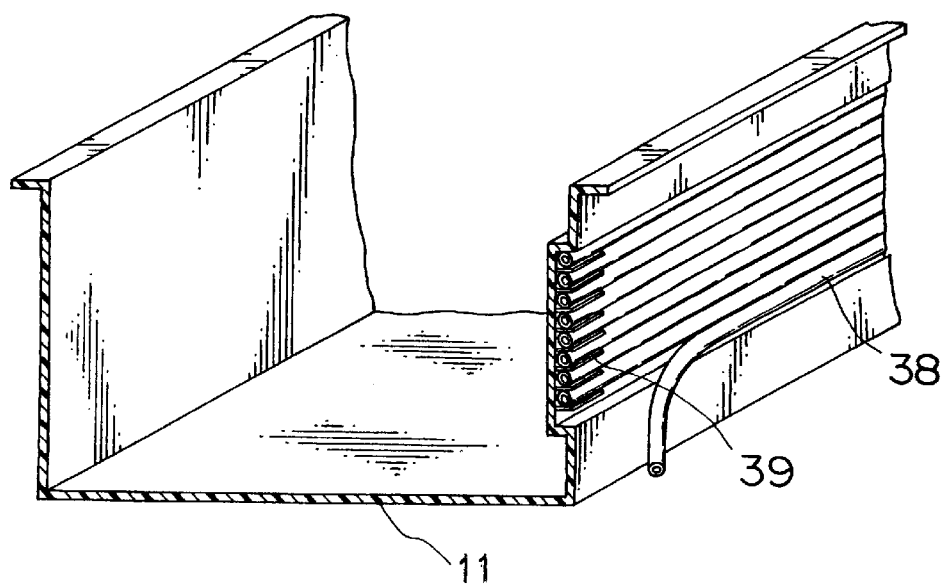

FIGS. 9A and 9B are illustrations showing a circuit sheet composing a wiring harness C for an instrument panel and a laying method thereof according to a further embodiment of the invention.

That is, the circuit sheet 22", as shown in FIG. 9A, has a flat sheet consisting of a plurality of insulated electrical wires 38 that are flexible, elastic, and fine. The circuit sheet 22" has a plurality of desired slits 39 in the same way as one shown in FIG. 6, and is disposed and fixed on a harness receiving recess 16 of the duct 11 with an adhesive as shown in FIG. 9B.

Furthermore, as another wiring method, in the harness disposing recess 16 there may be directly laid a plurality of insulated wires 38 by an automatically wiring machine (not shown), and the step shown in FIG. 9B may be taken at last.

Figure 10:
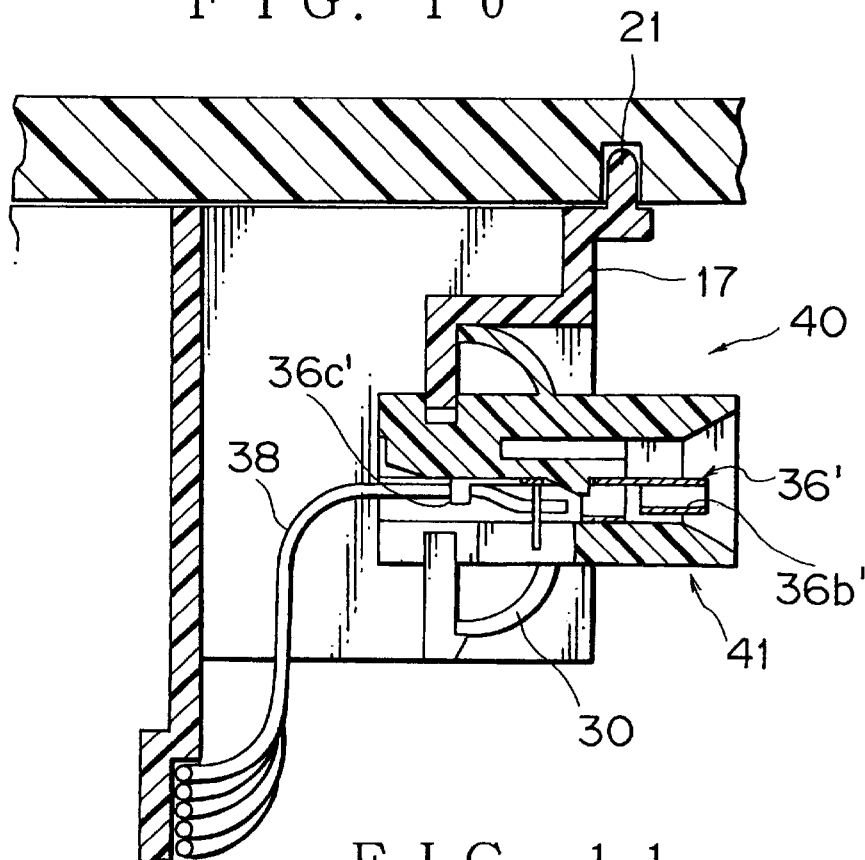
FIG. 10 is a sectional view showing the state that the connector holder shown in FIG. 4 has supported a self-mating connector for another unit.
Figure 11:
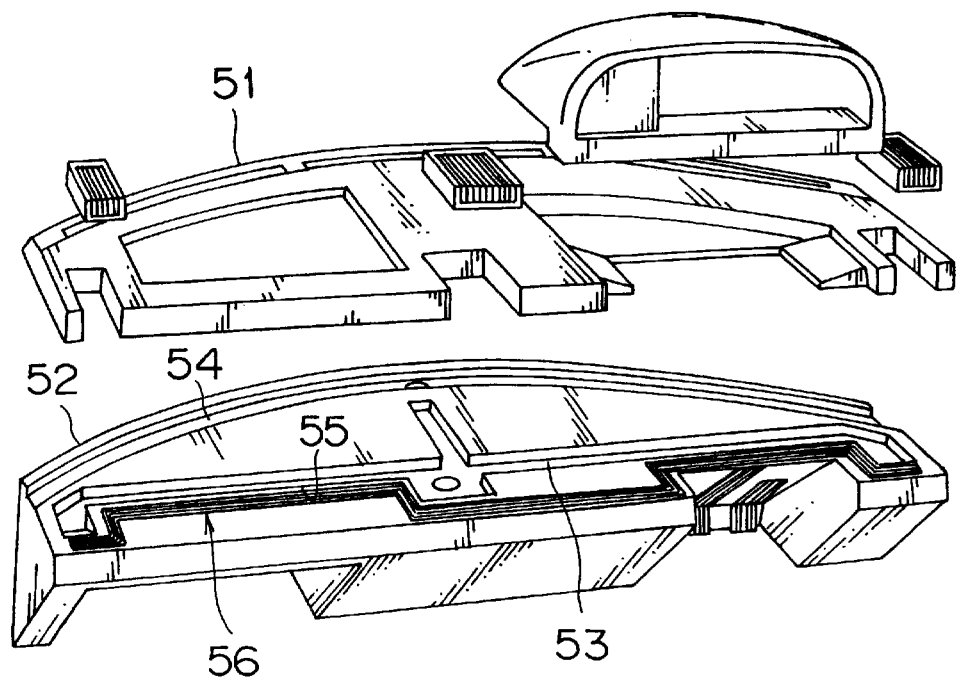
FIG. 11 is an explanatory perspective view of a known instrument panel for a motor car.

FIG. 10 shows a further embodiment of a self-mating connector according to the invention.

That is, the self-mating connector 40 has press-contacting terminals 36' inserted in an insulating housing 41 that has spring plates 30 on a periphery thereof. The insulating housing 41 is similar in structure to the insulating housing 35 of the harness connecting connector 34. The press-contacting terminal 36' has a male terminal chamber 36b' for receiving an opposing male terminal (not shown) in place of the elastic tongue portion 36b' of the press-contacting terminal 36 (shown in FIG. 7). The other construction is the same as the press-contacting terminal 36, descriptions of which will be omitted. A contact strip 36c' of the press-contacting terminal 36' press-contacts with the insulated electrical wire 38 of the circuit sheet 22" in FIG. 9.

Thus, the self-mating connector, as shown in FIGS. 5 and 8, may be modified in design according to the structure of an opposing, harness connecting connector 34 and circuit sheets 22 to 22" connected thereto.

What is claimed is:

1. A wiring harness and instrument panel assembly comprising:

a plurality of electrical equipment units having a harness connecting connector;

an instrument panel having a plurality of mounting openings for said electrical equipment units;

a wiring harness having a flexible flat circuit sheet and a plurality of self-mating connectors for said electrical equipment units, said self-mating connectors being respectively connected to said flexible flat circuit sheet; and an assembly housing disposed in said instrument panel, said assembly housing having:

a front wall with a harness receiving recess to fixedly mount said flexible flat circuit sheet; and a plurality of connector holders, each of which supports one of said self-mating connectors so that one of said self-mating connectors is connected with said harness connecting connector when said electrical equipment units are inserted into said mounting openings of said instrument panel.

2. An assembly as claimed in claim 1, wherein said assembly housing further has an air duct main body and a sub-duct provided in the middle of the front face of said main body; said air duct main body has a welding face at an upper periphery thereof; and said welding face is welded to and sealed by the top wall of said instrument panel.

3. An assembly as claimed in claim 1, wherein one of said self-mating connectors is supported on one of said connector holders by way of a plurality of spring plates.

4. An assembly as claimed in claim 1, wherein one of said self-mating connectors comprises:

a connector housing body; and a retainer engaging with said housing body, said retainer holding a terminal portion of said flexible flat circuit sheet.

5. An assembly as claimed in claim 4, wherein said terminal portion has a contact strip, a leading end of which is turned back in a U-shape in the direction away from a contact face of said strip.

6. An assembly as claimed in claim 4, wherein said terminal portion has a contact strip, a leading end of which is bent to form a stepped portion in the direction away from a contact face of said strip.

7. A wiring harness and instrument panel assembly comprising:

a plurality of electrical equipment units having a harness connecting connector;

an instrument panel having a plurality of mounting openings for said equipment units, said instrument panel having a plurality of connector holders;

a wiring harness having a flexible flat circuit sheet and a plurality of self-mating connectors for said equipment units, said self-mating connectors being respectively connected to said flexible flat circuit sheet; and an assembly housing disposed in the instrument panel, said assembly housing having a front wall with a harness receiving recess to fixedly mount said flexible flat circuit sheet, wherein each of said connector holders supporting one of said self-mating connectors so that one of said self-mating connectors are connected with said harness connecting connector when said electrical equipment units are inserted into said mounting openings of said instrument panel.

8. An assembly as claimed in claim 1, wherein said assembly housing further has an air duct main body and a sub-duct provided in the middle of the front face of said main body wherein, said air duct main body has a welding face at an upper periphery thereof, and said welding face is welded to and sealed by the top wall of said instrument panel.

9. An assembly as claimed in claim 7, wherein one of said self-mating connectors is supported on one of said connector holders by way of a plurality of spring plates.

10. An assembly as claimed in claim 7, wherein one of said self-mating connectors comprises a connector housing body and a retainer engaging with said housing body, said retainer holding a terminal portion of said flexible flat circuit sheet.

11. An assembly as claimed in claim 10, wherein said terminal portion has a contact strip, a leading end of which is turned back in a U-shape in the direction away from a contact face of said strip.

12. An assembly as claimed in claim 10, wherein said terminal portion has a contact strip, a leading end of which is bent to form a stepped portion in the direction away from a contact face of said strip.

* * * * *